United States Patent [19]

Ohkubo et al.

[11] Patent Number: 5,185,423

[45] Date of Patent: Feb. 9, 1993

[54] METHOD OF MAKING SULFONATED HYDROXY-FUNCTIONAL POLYURETHANE BINDER FOR MAGNETIC RECORDING MEDIA

[75] Inventors: Takatoshi Ohkubo, Atsugi, Japan; James G. Carlson, Maplewood, Minn.

[73] Assignee: Minnesota Mining and Manufacturing Company, St. Paul, Minn.

[21] Appl. No.: 751,334

[22] Filed: Jul. 29, 1991

Related U.S. Application Data

[60] Division of Ser. No. 429,720, Oct. 31, 1989, Pat. No. 5,071,578, which is a continuation-in-part of Ser. No. 295,046, Jan. 6, 1989, abandoned.

[51] Int. Cl.$^5$ .............................................. C08G 18/32
[52] U.S. Cl. ................................. 528/85; 525/131; 528/44; 428/425.9; 428/694
[58] Field of Search ............... 525/131; 528/44, 48, 528/71, 85; 428/425.9, 694

[56] References Cited

U.S. PATENT DOCUMENTS

| | | | |
|---|---|---|---|
| 4,152,485 | 5/1979 | Mizumura et al. | 428/425 |
| 4,174,434 | 11/1979 | Dieterich et al. | 528/85 |
| 4,320,171 | 3/1982 | Motz et al. | 428/423.1 |
| 4,411,957 | 10/1983 | Tokuda et al. | 428/425.9 |
| 4,423,115 | 12/1983 | Tokuda et al. | 428/425.9 |
| 4,521,486 | 6/1985 | Ninomiya et al. | 428/407 |
| 4,529,661 | 7/1985 | Ninomiya et al. | 428/425.9 |
| 4,613,626 | 9/1986 | Chubachi | 428/328 |
| 4,615,949 | 10/1986 | Yoda et al. | 428/425.9 |
| 4,659,626 | 4/1987 | Fukushima et al. | 428/425.9 |
| 4,666,784 | 5/1987 | Inukai et al. | 428/425.9 |
| 4,686,145 | 8/1987 | Honda et al. | 428/425.9 |
| 4,752,530 | 6/1988 | Yamada et al. | 428/425.9 |
| 4,784,907 | 11/1988 | Matsufuji et al. | 428/328 |
| 4,784,914 | 11/1988 | Matsufuji et al. | 428/418 |
| 4,786,557 | 11/1988 | Kakuishi et al. | 428/418 |

FOREIGN PATENT DOCUMENTS

| | | |
|---|---|---|
| 0143337 | 6/1985 | European Pat. Off. |
| 58-185027 | 10/1983 | Japan |
| 61-198417 | 9/1986 | Japan |
| 61-123017 | 10/1986 | Japan |
| 62-121923 | 6/1987 | Japan |
| 62-185225 | 8/1987 | Japan |
| 62-185226 | 8/1987 | Japan |

*Primary Examiner*—Paul J. Thibodeau
*Assistant Examiner*—Stevan A. Resan
*Attorney, Agent, or Firm*—Gary L. Griswold; Walter N. Kirn; David B. Kagan

[57] ABSTRACT

The present invention concerns magnetic recording media comprising fine, magnetizable pigment for particles dispersed wtihin a binder and supported on a substrate. The invention particularly concerns the nature of the binder polymer and its preparation. The binder polymer is a curable polymerr comprising a sulfonated, hydroxy-functional polyurethane polymer. A plurality of SO$_3$M groups are pendant from the polyurethane polymer backbone. The SO$_3$M groups have an equivalent weight of from about 2,000 to about 100,000. M is selected from the group consisting of H$^+$, Li$^+$, Na$^+$, K$^-$, NR$_4$$^+$ where R can be H$^+$ or an alkyl group, and mixtures thereof. A plurality of hydrophobic polymer chain segments are incorporated into the polyurethane polymer that comprise residues of a polyol having a molecular weight of at least about 180. The hydrophobic chain segments have a carbon atom to polar functionality of at least about 60. The polyurethane polymer also comprises a plurality of cross-linkable hydroxy groups having an equivalent weight of from about 500 to about 10,000. At least a majority of the hydroxy groups are pendant from hydrophobic chain segments.

4 Claims, No Drawings

METHOD OF MAKING SULFONATED HYDROXY-FUNCTIONAL POLYURETHANE BINDER FOR MAGNETIC RECORDING MEDIA

This is a division of application Ser. No. 07/429,720, now U.S. Pat. No. 5,071,578 filed Oct. 31, 1989, which is a continuation-in-part of application Ser. No. 07/295,046 filed Jan. 6, 1989 now abandoned.

FIELD OF THE INVENTION

The present invention concerns magnetic recording media comprising fine, magnetizable pigment dispersed within a binder and supported on a substrate. The invention particularly concerns the nature of the binder and its preparation.

BACKGROUND OF THE INVENTION

Magnetic recording media generally include a binder dispersion layer comprising a binder and a pigment overlying a substrate, wherein the pigment is dispersed within the binder. Typically, the pigment is a magnetizable pigment comprising small, magnetizable particles. In some instances, the medium may be in the form of a composite having both back-coat and front-coat binder dispersion layers, although the pigment in the back-coat may or may not be a magnetizable pigment.

It has become desirable to have as high a loading of magnetizable pigment in the magnetic recording media as is reasonably possible. It is often preferred to have a binder dispersion comprising from about 70% to 80% by weight magnetizable pigment relative to the binder with as many magnetizable particles per unit area or unit volume as possible. It is also preferred to have a binder dispersion in which the magnetizable pigment comprises a plurality of small particles having a relatively high specific surface area. Higher pigment loading has the potential to provide high density magnetic recording media capable of storing more information.

Problems, however, remain in the art concerning magnetic recording media having a relatively high loading of magnetizable pigment. To begin with, magnetizable pigments tend to agglomerate, and they are difficult to properly and fully disperse within the binder. Wetting agents, or dispersants, are often employed to facilitate such dispersion. For higher pigment loading, i.e., the use of greater amounts by weight and number of magnetizable particles, greater amounts of such dispersants are required, which is not always desirable. There are a number of reasons for using as little dispersant as possible. Costs, for example, can be reduced by using less dispersant. Additionally, binder dispersions can be more readily and reproducibly prepared when less dispersant is used. Further, excess dispersant may have a tendency to bloom from a cured binder dispersion over time, leading to contamination of a recording head or the like, or causing a change in the physical or chemical characteristics of the media.

Another problem in the art is that the viscosity of a binder dispersion generally increases with higher loading of magnetizable pigment. If the dispersion is too viscous, it can be difficult to apply to the substrate, and good magnetic orientation of the pigment, i.e., a squareness ratio of 0.75 or more, can be hard to obtain. The squareness ratio (Br/Bm), which is the ratio of the remnant saturation induction, or residual magnetization (Br), to the saturation induction, or saturation magnetization (Bm), refers to the effectiveness of the orientation of the magnetic particles. For randomly-oriented particles, the squareness ratio is 0.5 and for ideally and perfectly oriented particles, the ratio is equal to 1.0. Values for the squareness ratio, of media exhibiting good performance, normally fall around 0.75 to 0.85, with higher values being significantly better. In general, an increase in the squareness ratio is reflected by an improvement in orientation characteristics and electromagnetic properties and an increase from 0.75 to 0.80 (i.e. an increase of 0.05) results in a significant advantage. The difference between a 0.75 and a 0.85 squareness ratio typically represents about a 1 decibel improvement in electromagnetic characteristics, which is manifested by an approximate 10% improvement in electromagnetic properties such as signal output and/or signal-to-noise ratio.

To help alleviate these problems with high pigment loading, binder compositions having internal dispersants have been developed. Such compositions comprise polymers with functional moieties pendant from the polymer backbone that help disperse the magnetizable pigment. As a result of using these compositions, less dispersant is needed for dispersion of magnetizable pigment in the binder. Unfortunately, the known compositions having internal dispersants have been ineffective, or inefficient, for obtaining magnetic recording media having a relatively high pigment loading and/or a relatively high magnetic orientation, i.e., squareness ratio.

One class of such compositions comprises sulfonated polyurethanes. See, for example, U.S. Pat. No. 4,152,485, incorporated herein by reference. Although the sulfonated polyurethanes exhibit low viscosity for providing good, initial magnetic orientation, they may not cure sufficiently to maintain such orientation over long periods and may have inferior durability. Generally, it is the curing of the binder that retains the magnetizable pigment in an oriented manner.

Another class of binder compositions having internal dispersants comprises hydroxy-functional, sulfonated polyurethanes. See, for example, Japanese Kokai reference 61-198417, incorporated herein by reference. The hydroxy-functional, sulfonated polyurethanes have excellent curing properties as a result of the cross-linking capability provided by the hydroxy functionality. Unfortunately, however, the known hydroxy-functional, sulfonated polyurethanes exhibit such high dispersion viscosity that good initial magnetic orientation is difficult, or impossible, to obtain.

SUMMARY OF THE INVENTION

The present invention relates to a binder composition characterized by a low dispersion viscosity for use in magnetic recording media and the like that includes an internal dispersion moiety and cross-linking functionality. The present invention has the advantage of providing excellent dispersion of magnetic pigment, while, at the same time, providing magnetic recording media having relatively high magnetic orientation (i.e., a squareness ratio of at least 0.75), even under conditions of relatively high pigment loading. As another advantage associated with having a low dispersion viscosity, the binder compositions of the present invention are also easier to apply to a recording media substrate than the more viscous binder compositions known in the art.

One aspect of the invention concerns a novel binder composition. The binder composition is a curable polymer comprising a sulfonated, hydroxy-functional polyurethane polymer. A plurality of SO₃M groups are pendant from the polyurethane polymer backbone. The polyurethane polymer has a SO₃M equivalent weight of from about 2,000 to 160,000, and preferably from about 5,000 to 30,000. The cation M is selected from the group consisting of $H^+$, $Li^+$, $Na^+$, $K^+$, $NR_4^+$ where R can be $H^+$ or an alkyl group, and mixtures thereof.

The polyurethane polymer also comprises a plurality of hydrophobic polymer chain segments incorporated into the polyurethane polymer that are residues of a polyol having an average molecular weight of at least about 180. Preferably, the polyol is a triol. The hydrophobic polymer chain segments also have a carbon atom to polar functionality ratio of at least about 3:1 and a hydroxy equivalent weight of at least about 60 and most preferably from about 100 to 500.

A plurality of cross-linkable hydroxy groups are pendant from the polyurethane polymer backbone. The polyurethane polymer has a hydroxy equivalent weight of from about 500 to about 10,000, and preferably from about 1000 to 5000. At least a majority, preferably 90%, and most preferably all, of the hydroxy groups are pendant from the hydrophobic polymer chain segments.

In another aspect, the present invention concerns a dispersion for use in magnetic recording media. The dispersion comprises the binder composition described above. A magnetizable pigment is dispersed in the composition.

In another aspect, the present invention concerns a composite for magnetic recording. The composite includes a substrate having a front side and a back side. A cured dispersion comprising the above-described binder composition is coated on at least one side of the substrate. A magnetizable pigment is dispersed in the cured dispersion.

In another aspect, the invention concerns a method of making a curable, sulfonated, hydroxy-functional polyurethane polymer. The method comprises the step of reacting a polyol with a sulfonate-containing polyisocyanate having at least two reactive isocyanate groups. The polyol has at least three reactive hydroxy groups and a hydroxy equivalent weight of at least 60. The polyol is present in a sufficient amount such that:

(i) there is at least about a 67% excess of reactive hydroxy groups relative to reactive isocyanate groups;

(ii) said polyurethane polymer has a hydroxy equivalent weight of between about 500 and about 10,000; and (iii) at least about 90% of the hydroxy-functionality in said polyurethane polymer results from said polyol.

The term "equivalent weight", as used herein with respect to a functionality or moiety, refers to the mass of polymer per mole, or equivalent, of functionality.

Binder compositions according to the present invention do not require wetting agents for facilitating dispersion of the magnetic pigment. That is, excellent dispersion can be obtained, even in the absence of added dispersing agents. It is noted, however, that adjuvants such as head-cleaning agents, wetting agents, and lubricants still may be optionally utilized in the present invention. Binder compositions according to the present invention also can be utilized to form backside layers in magnetic recording media without magnetic pigment dispersed therein.

DETAILED DESCRIPTION OF THE INVENTION

The present invention concerns a curable polymer, comprising a sulfonated, hydroxy-functional polyurethane polymer. The polyurethane polymer may be viewed as comprising a plurality of segments, each segment being a structural fragment resulting from the reaction of a polyol with a polyisocyanate. The individual segments can be viewed as being soluble (hydrophobic) or insoluble (hydrophilic) in character. The term "insoluble" as used herein is meant to refer to a polyurethane segment of such a character that if a moderate to high molecular weight polyurethane (for example about 50,000 weight average) were made exclusively of the segment, the polymer would not be soluble in organic solvents such as methyl ethyl ketone, cyclohexanone, toluene, or tetrahydrofuran. On the other hand, a "soluble" segment is one of such a character that if a moderate to high molecular weight polyurethane (for example 50,000 weight average) were made exclusively of the segment, the polymer would be soluble in the above-mentioned solvents. Preferred polyurethane polymers according to the present invention have both soluble and insoluble segments.

Herein, soluble (hydrophobic) and insoluble (hydrophilic) segments are generally identified and distinguished by relative molecular weight, chain length, and/or relative amount of polar functionality or character. That is, one way for identifying or defining these segments involves a comparison of the ratios of the number of carbon atoms to polar groups in the segment precursor. The term "polar group" as used in this context is meant to refer to such highly polar groups as hydroxy-, sulfonate-, amino-, urethane-, and urea-groups, but not ester, carbonate, or ether functionality. In general, a ratio of less than about 3:1 identifies a precursor to an insoluble segment; whereas, a ratio of greater than about 3:1 identifies a precursor to a soluble segment. For example, under this model neopentyl glycol (5 carbons/2 polar groups) is a precursor to an insoluble segment, and a polycaprolactone triol such as Union Carbide Tone ™ 0305 (about 28 carbons/3 polar groups) is a precursor to a soluble segment. Generally, the hydrophobic, i.e., soluble, polymer chain segments are residues comprising a polyol having an average molecular weight of at least about 180. Preferably, said polyol residue is a triol.

A plurality of SO₃M groups are pendant from the polyurethane polymer backbone polyurethane polymer has a SO₃M equivalent weight of from about 2,000 to about 100,000. Most preferably, the polyurethane polymer has a SO₃M equivalent weight of from about 5,000 to 30,000. The cation M designates a cation selected from the group consisting of $H^+$, the alkali metal cations, i.e., $Na^+$, $Li^+$, and $K^+$, and $NR_4^+$ wherein R can be hydrogen or an alkyl group. M is preferably selected from the group consisting of $Li^+$, $Na^+$, $K^+$, and mixtures thereof, since the corresponding acids, if present in the final polymer, may tend to produce an overall polymer that is subject to decomposition. The SO₃M groups wherein M is selected from $Li^+$, $Na^+$, $K^+$, and mixtures thereof, on the other hand, have been found to be excellent dispersive moieties.

Preferably, the SO₃M groups are pendant from aromatic or aliphatic organic moieties that are incorporated into the polyurethane backbone. If a SO₃M group is pendant from an aliphatic moiety, then such a group shall be referred to as an aliphatic SO$_3$M group. If an SO$_3$M group is pendant from an aromatic moiety, than such a group shall be referred to as an aromatic SO$_3$M group.

Most preferably, the SO$_3$M group is an aromatic SO$_3$M group, wherein M is Na, since at least one example of this type of compound is readily available from commercial sources, it can be easily incorporated into the polyurethane backbone, and its properties are well known. This preferred aromatic sodium sulfonate compound is dimethyl sodium sulfoisophthalate (DMSSIP).

It is believed that the sulfonate groups can be in either the hydrophobic or hydrophilic environments. However, if the sulfonate groups are located in the hydrophilic environments, the monomers used to make the polyurethane resin, or the resin itself, may not be sufficiently soluble in certain organic solvents such as methyl ethyl ketone cyclohexanone, toluene, or tetrahydrofuran.

A plurality of cross-linkable hydroxy groups are pendant from the polyurethane polymer backbone. The polyurethane polymer has a hydroxy equivalent weight of from about 500 to 10,000. Most preferably, the polyurethane polymer has a hydroxy equivalent weight of from about 1,000 to 5,000. A majority, preferably 90% or more, and most preferably all, of the cross-linkable hydroxy groups are pendant from hydrophobic polymer chain segments. That is, the cross-linkable hydroxy groups are positioned within the polymer at locally hydrophobic sites.

By the term "locally hydrophobic" it is meant that the cross-linkable hydroxy groups are located in portions of the polymer that do not include, in the immediate vicinity of a hydroxy group, any moieties that are substantially polar or hydrophilic. Preferably, the hydroxy groups are each positioned in polymer chain segments having lengths of at least about 5 atoms separating the hydroxy group from the nearest polar group. Alternatively phrased, if the hydroxy group is positioned in a substantially hydrophobic fragment or segment whose precursor has a molecular weight of at least about 180, and preferably about 200 to about 1,000, it will be considered to be in a hydrophobic environment (or soluble segment). Most preferably, the hydroxy functionality is substantially centrally positioned within such a fragment or segment. The term "cross-linkable" and variants thereof, when used to refer to moieties in a polymer, is meant to refer to moieties available for cross-linking in final cure. It is not meant or implied that all cross-linkable moieties are necessarily cross-linked during final cure.

Polyurethane binders according to the present invention are uniquely characterized by the hydrophobic environment in which most of the cross-linkable hydroxy groups are presented relative to the environment of the sulfonate dispersing moiety. When such is the case, the resultant polyurethane generally exhibits relatively low dispersion viscosity when loaded with pigment. For example, a binder dispersion according to the present invention generally exhibits a dispersion viscosity of less than about 20,000 centipoise and preferably less than about 5,000 centipoise. Being characterized by a low dispersion viscosity, the binder compositions according to the present invention provide magnetic recording media having high squareness.

While the reason that the present invention is characterized by low dispersion viscosity is not presently known, and the inventors do not wish to be held to any particular theory, a rationale can be suggested. Practical tests have shown that any interaction between the hydroxy groups and the oxide surfaces of the pigment appears to generally increase viscosity. Being in a hydrophobic environment, the cross-linkable hydroxy groups are less likely to encounter pigment surface for adhesion thereto than they would be if in hydrophilic environments. As a result, interactions between the cross-linking moiety and the oxide surfaces of the pigment are minimized. Further, interference between the cross-linking moiety, i.e., the hydroxy groups, and the dispersant moiety, i.e., the SO$_3$M groups, is also minimized. Thus, the advantages of the present invention may result, at least in part, from reduction in the likelihood of interaction among the cross-linkable hydroxy groups and oxide surfaces of the pigment. It is also believed that the interaction of the sulfonate groups with the oxide surfaces facilitates the dispersion of the magnetic pigment.

In the method of the invention, a curable, sulfonated, hydroxy-functional polyurethane is prepared by reacting a polyol with a sulfonated polyisocyanate having at least two reactive isocyanate groups. The polyol is generally hydrophobic. Preferably the polyol has at least three reactive hydroxy groups and has a hydroxy equivalent weight of at least about 60. Such a polyol can be reacted with a sulfonated polyisocyanate at two reactive hydroxy sites to prepare a polyurethane resin having at least one hydroxy group available for later cross-linking during cure of the polymer. The polyol is present in a sufficient amount such that there is at least about a 67% excess of reactive hydroxy groups relative to reactive isocyanate groups.

Typically, the polyol is a triol. Preferred triols are triols having a molecular weight greater than about 180. Most preferred are triols having a molecular weight of from about 200 to about 1,000. A preferred class of triols comprises polycaprolactone triols. One particularly useful triol is a polycaprolactone triol having a hydroxy equivalent weight of about 180 (molecular weight approximately 540). One such high molecular weight triol is available under the trade designation Tone TM 0305 from Union Carbide Company. Other useful triols include polypropylene oxide triol, and polyester triols other than polycaprolactone triols, e.g. butylene adipate triols.

Preferably the hydroxy groups in the triol are primary, facilitating rapid reaction with the curing agent to form the polymer. The reaction of primary alcohols with a diisocyanate such as diphenylmethane diisocyanate is relatively rapid at temperatures of about 45° C to 70° C. In some instances catalysts, such as dibutyltin dilaurate or dimethyltin dilaurate, may be used to facilitate reaction. It is foreseen, however, that some secondary triols may be utilized in compositions according to the present invention. It is also foreseen that mixtures of various triols may be utilized.

The sulfonated polyisocyanate can be prepared by reacting a sulfonated diol with an excess of polyisocyanate. Preferably, there is at least a 30% excess of isocyanate functionality in the polyisocyanate relative to hydroxy functionality in the sulfonated diol.

A wide variety of polyisocyanates may be utilized to form the polymers of the present invention. A particularly well-known and useful class of polyisocyanates are diisocyanates such as diphenylmethane diisocyanate. Other useful diisocyanates include: isophorone diisocyanate; toluene diisocyanate; hexamethylene diisocyanate; tetramethylene diisocyanate; and, p-phenylene diisocyanate. It is noted that mixtures of diisocyanates can also be used.

A preferred class of sulfonated diols or monomers can be prepared from the reaction of from about two to about four equivalents of an appropriate diol per equivalent of dimethyl sodium sulfoisophthalate (DMSSIP). The isophthalate includes two ester groups that can be readily esterified, by reaction with two equivalents of diol, to lead to an extended diol structure having an aromatic sulfonate group therein. In some instances, catalysts such as tetrabutyltitanate may be used to facilitate the reaction.

The reaction is generally represented by the following scheme:

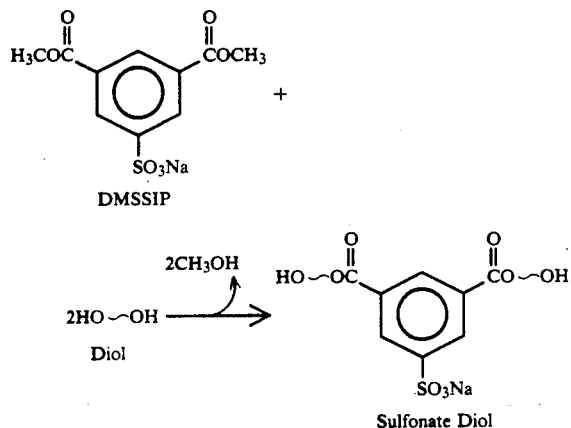

A variety of diols may be utilized. Also, mixtures of diols can be used. A preferred class of diols are the polycaprolactone diols having a hydroxy equivalent weight of from about 200 to 2,000. One such material is Tone TM 0210, available from Union Carbide Company. Tone TM 0210 is a polycaprolactone diol having a hydroxy equivalent weight of about 415. The result of reaction of about 4 equivalents of Tone TM 0210 per equivalent of DMSSIP is a sulfonated diol having a hydroxy equivalent weight of about 603 and a centrally located aromatic sulfonate group.

Other diols which may be reacted with DMSSIP, in order to provide a sulfonated monomer for incorporation in polymers according to the present invention include: polyether diols such as polytetramethylene glycols and polypropylene glycols; polycarbonate diols such as Duracarb 120, a polycarbonate diol sold by PPG Industries, Inc., Pittsburgh, Pa. 15272; and, polyester diols, such as a polyester diol that is the reaction product of adipic acid and butane diol. Additionally, sodium dimethyl-5-sulfoisophthalate may be utilized with: other diesters or diacids including dimethyl isophthalate, dimethyl terephthalate, and dimethyl adipate; and, diols to produce co-polyester diols containing sulfonate. Some examples of such diols are: ethylene glycol; propylene glycol; 1,3- propane diol; 1,4-butane diol; 1,5-pentane diol; 1,6-hexane diol; neopentyl glycol; diethylene glycol; dipropylene glycol; 2,2,4-trimethyl-1,3-pentane diol; 1,4-cyclohexanedimethanol; ethylene oxide and/or propylene oxide adduct of bisphenol A; ethylene oxide and/or propylene oxide adduct of hydrogenated bisphenol A; polyethylene glycol; polypropylene glycol; and, polytetramethylene glycol.

Optionally, it may be desirable to use other polyols to prepare the polyurethane polymer in order to give preferred characteristics to the polyurethane. For example, chain extension agents may be incorporated into the polyurethane backbone, to improve ductility or strength characteristics. Such polyols are typically diols, so that use of such optional polyols for making the polyurethane polymer provides relatively little, if any, unreacted hydroxy groups available for later cross-linking. Such polyols include neopentyl glycol, 1,4-butane diol, 1,6-hexane diol, cyclohexane dimethanol, ethylene glycol, and polyester polyols such as Tone TM 0210 and Tone TM 0230, otherwise referred to herein as non-sulfonated diols. Preferably, at least some low molecular weight (less than about 120) diols, i.e., non-sulfonate-containing diols, are used to provide preferred characteristics to the overall product. Also, higher molecular weight non-sulfonated diols, such as the polycaprolactone diols Tone TM 0210 or Tone TM 0230, may be used to provide preferred characteristics to the product. It is further noted that for any of the reactants mentioned, mixtures of materials can be utilized.

A preferred method of preparing polyurethane polymers according to the present invention comprises the reaction of three key components described above: the sulfonated diol; the polyisocyanate; and the triol. This preferred method shall be referred to herein as the "prepolymer synthetic method". This method is designed to ensure that substantially all of the unreacted hydroxy groups in the resin that are available for final cure are those hydroxy groups that are pendant from the triol, i.e., the hydrophobic segment precursor. It is noted that if the diol is also a hydrophobic, i.e., soluble, material, it may not be necessary to ensure that all unreacted hydroxy groups result from the triol.

In a first step, the sulfonated diol and any other optional polyols such as non-sulfonated diols, are reacted with an excess of the polyisocyanate to form a sulfonated polyisocyanate. There should be a sufficient excess of isocyanate functionality for substantially complete reaction of the diol hydroxy groups. For example, there should be at least a 30% excess of reactive isocyanate functionality in the polyisocyanate relative to hydroxy functionality in the diol and optionally-added polyols. This provides a sulfonated polyisocyanate with relatively little, if any, reactive hydroxy functionality for later cross-linking.

In a second step, the sulfonated polyisocyanate product of the first step is reacted with an excess of the triol. Typically, the triol reactant has a relatively high molecular weight, i.e. a molecular weight of at least about 180, and preferably about 200 to 1,000. The triol should have little other polar functionality other than the hydroxy groups, and the hydroxy groups should be well spaced in the triol. Preferably, there is at least a 67% excess of hydroxy functionality in the triol relative to isocyanate functionality in the sulfonated polyisocyanate.

As one example of the preferred prepolymer synthetic method, a sulfonate diol monomer, neopentyl glycol, and diphenylmethane diisocyanate are combined in methyl ethyl ketone solvent in a ratio such that the number of isocyanate groups per hydroxy group is initially about 1.3. After all available hydroxy groups have been reacted, a prepolymer is obtained containing an excess of isocyanate. The prepolymer is subsequently reacted with a hydrophobic triol such that the ratio of isocyanate groups to hydroxy groups is within the range of about 0.3 to about 0.6. The resultant polyurethane polymer product has cross-linkable hydroxy groups pendant from hydrophobic polymer chain segments comprising the triol.

A magnetic pigment can be readily dispersed within the resulting polyurethane/binder composition, dispersion being facilitated by the incorporated sulfonate moiety. The resulting dispersion can then be readily applied to the selected substrate, and cured through reaction of the remaining hydroxy groups.

Dispersions for use in preparing magnetic recording media of the present invention generally comprise a magnetic or magnetizable pigment and a curable polymer, as described above.

The preparation of dispersions of magnetic powders with polyurethanes, as characterized by the present invention, is relatively straight-forward. As indicated, addition of wetting agents or dispersing agents can generally be avoided, even with relatively high load situations, i.e., about 70% to 80% by weight of magnetic pigment relative to binder, used in the preparation of high density media, represented by about 45,000 flux changes per inch. A variety of pigments may be used, including: ferric oxide; gamma ferric oxide; chromium oxide; iron; iron-cobalt; cobalt; nickel; cobalt-nickel; cobalt-phosphorus; and barium ferrite.

It is foreseen that a variety of loadings, densities, solvent systems, etc., may be utilized. The following conditions are typical, and were employed in preparation of some of the dispersions reported in the examples below (parts by weight unless otherwise noted): 100 parts of fine pigment (Co-$\gamma$-Fe2O3) having a surface area 50 m$^2$/g and a powder coercivity of 780 Oersted; 30 parts of polyurethane; 134 parts of methyl ethyl ketone; 45 parts of toluene; and 45 parts of cyclohexanone, were combined and shaken in a 0.5 liter sandmill, with steel media, for 8 hours. The resulting dispersion could be readily applied to polyethylene terephthalate using a knife coating method.

The dispersion can be readily cured with a triisocyanate cross-linker. After a dispersion containing pigment, solvent, and binders is prepared, a curative is added. A typical curative comprises, for example, a triisocyanate such as the 3:1 adduct of toluene diisocyanate with trimethylol propane. One such material is available under the trade designation Mondur TM CB-75 from Mobay Company. The curative is preferably added in a proportion of about 1-20% based on binder weight. After the dispersion is coated and dried, a cure takes place either at room temperature or at elevated temperatures (50°-60° C.).

EXAMPLES

The present invention is illustrated by the following examples and the data presented in Table 1 and Table 2. Two methods for the synthesis of the polyurethane polymer are used in the examples. The preferred method is the "prepolymer synthetic" method wherein reactants are controlled such that in the final polymer substantially all free hydroxy groups are from the high molecular weight triol reactant and are thus in hydrophobic environments (Samples 1-6, 9, 10, 12 and 13, i.e., Experiments 3-8, 11, 12, 19 and 20). For comparison purposes, a "one-step synthetic method" is described (Samples 7 and 8, i.e. Experiments 9 and 10) wherein the free hydroxy groups are randomly derived from the triol and diol reactants.

In the following examples, the following agents are used:

Tone TM 0210—a polycaprolactone diol produced by Union Carbide, molecular weight about 825, hydroxy equivalent weight about 415, precursor to a sulfonate diol.

Tone TM 0230—a polycaprolactone diol from Union Carbide Company, molecular weight about 1,268, hydroxy equivalent weight about 634.

Neopentyl glycol—a low molecular weight diol, molecular weight 104, hydroxy equivalent weight 52, additive for providing preferred characteristics.

Duracarb TM 120—a polycarbonate diol available from PPG Industries, Inc., molecular weight about 880, hydroxy equivalent weight about 440.

DMSSIP dimethyl sodium sulfoisophthalate, an aromatic sodium sulfonate salt, molecular weight 296, equivalent weight 148, preferred metal sulfonate salt.

Tone TM 0305—a polycaprolactone triol available from Union Carbide, molecular weight about 540, hydroxy equivalent weight about 180, about 28 carbons/3 polar groups, precursor to a soluble segment.

Tone TM 0301—a polycaprolactone triol produced by Union Carbide, molecular weight about 297, hydroxy equivalent weight about 99, about 15 carbons/3 polar groups, precursor to a soluble segment.

LHT 240—a polypropylene oxide triol produced by Union Carbide, molecular weight about 714, hydroxy equivalent weight about 238, about 35 carbons/3 polar groups, precursor to a soluble segment.

Diphenylmethane diisocyanate—an isocyanate, molecular weight 250, isocyanate equivalent weight 125.

EXAMPLE 1

Preparation of Preferred Sulfonate Monomer (A)

67.77 kilograms of Tone TM 0210 (164 equivalents), 8.16 kilograms of toluene, and 5.72 kilograms of DMSSIP (39 equivalents) were combined and then heated to 80° C. with distillation of toluene. The remainder of the toluene was removed under vacuum at 110° C. The vacuum was released under nitrogen and 40 grams of tetrabutyltitanate was added. The system was then heated to 200° C. under nitrogen and held for 3 hours while collecting methanol distillate. After cooling to 120° C., the reaction mixture was placed in a vacuum, and these conditions were held for 4 hours. The product was filtered and cooled. The hydroxy equivalent weight by analysis was determined to be 603 grams/equivalent. The sulfonate equivalent weight was calculated to be 3745 grams/equivalent.

EXAMPLE 2

Preparation of Higher Sulfonate Content Monomer (B)

1750 grams of Tone TM 0210 (4.24 equivalents), 100 grams of toluene, and 314.76 grams of DMSSIP (2.13 equivalents) were combined in a 3 liter flask and heated under nitrogen to 175° C. with distillation of toluene. 1 gram of tetrabutyltitanate catalyst was added and the temperature was raised to 200° C. and held for 3 hours, collecting methanol and residual toluene. After cooling to 150° C., the reaction mixture was placed in a vacuum and heated to 200° C. These conditions were held for 1 hour. The product was cooled under vacuum and filtered. The hydroxy equivalent weight of the product was determined to be 852 grams/equivalent. The sulfonate equivalent weight was calculated to be 1879 grams/equivalent.

EXAMPLE 3

Preparation of Preferred Sulfonated Polyurethane Binder (Sample 1)

74.84 kilograms of methyl ethyl ketone, 18.14 kilograms of cyclohexanone, 3.97 kilograms of neopentyl glycol (76.2 equivalents), and 15.88 kilograms of sulfonate diol monomer A (29.1 equivalents) were combined, and 9.1 kilograms of methyl ethyl ketone was distilled off. 17.15 kilograms of diphenylmethane diisocyanate (137.2 equivalents) and 23 grams of dibutyltin dilaurate were added. The reaction was held at 35° C. for 3 hours whereupon this prepolymer solution was drained to a clean dry holding container. It showed an isocyanate equivalent weight of 1450 grams/equivalent.

22.68 kilograms of methyl ethyl ketone and 12.02 kilograms of Tone TM 0305 (66.8 equivalents) were combined in the reaction vessel whereupon the prepolymer solution was added to this reaction mixture with stirring. After the isocyanate had reacted, a further addition of 1.2 kilograms of diphenylmethane diisocyanate gave a final inherent viscosity in tetrahydrofuran of 0.30. The product had a hydroxy equivalent weight measured to be 1700 grams/equivalent and the sulfonate equivalent weight was calculated to be 12,000 grams/equivalent.

EXAMPLE 4

Preparation of Preferred Polyurethane Material With Lower Sulfonate Content (Sample 2)

690 grams of methyl ethyl ketone, 67.2 grams of Tone TM 0210 (0.163 equivalents), 35.7 grams of neopentyl glycol (0.686 equivalents), and 62.3 grams of sulfonate diol monomer A (0.114 equivalents hydroxy) were combined, and 100 grams of methyl ethyl ketone was distilled off. 156.4 grams of diphenylmethane diisocyanate (1.251 equivalents) and 0.02 grams of dibutyltin dilaurate were added. The reaction was held at 35° C. for 3 hours, producing the prepolymer solution.

230 grams of methyl ethyl ketone and 119.5 grams of Tone TM 0305 (0.664 equivalents) were combined in a reaction vessel and the prepolymer solution was added with stirring. After the isocyanate had reacted, further additions of diphenylmethane diisocyanate, totaling 8.8 grams, gave an inherent viscosity in tetrahydrofuran of 0.28. The calculated hydroxy equivalent weight was 1500 grams/equivalent and the calculated sulfonate equivalent weight was 27,000 grams/equivalent.

EXAMPLE 5

Preparation of Preferred Polyurethane Material Made With Polycaprolactone Triol of Molecular Weight 297 (Sample 3)

627 grams of methyl ethyl ketone, 17.5 grams of Tone TM 0210 (0.042 equivalents), 28.7 grams of neopentyl glycol (0.551 equivalents), and 136.5 grams of sulfonate diol monomer A (0.250 equivalents hydroxy) were combined, and 100 grams of methyl ethyl ketone were distilled off. 136.9 grams of diphenylmethane diisocyanate (1.10 equivalents) and 0.02 grams of dibutyltin dilaurate were added. The reaction was held at 35° C. for 3 hours, producing the prepolymer solution.

209 grams of methyl ethyl ketone and 64.51 grams of Tone TM 0301 (0.652 equivalents) were combined in a reaction vessel, and the prepolymer solution was added with stirring. After the isocyanate had reacted, further additions of diphenylmethane diisocyanate, totaling 18.4 grams, were made. The reaction was determined to be complete when no free isocyanate was seen by infrared spectroscopy. The product had an inherent viscosity in tetrahydrofuran of 0.30 and a calculated hydroxy equivalent weight of 1600 grams/equivalent. The calculated sulfonate equivalent weight was determined to be 11,000 grams/equivalent.

EXAMPLE 6

Preparation of Preferred Polyurethane Material Made With Polypropylene Oxide Triol of Molecular Weight 714 (Sample 4)

842 grams of methyl ethyl ketone, 33.0 grams of neopentyl glycol (0.634 equivalents), and 132 grams of sulfonate diol monomer A (0.24 equivalents hydroxy) were combined, and 142.4 grams of diphenylmethane diisocyanate (1.14 equivalents) and 0.02 grams dibutyltin dilaurate were added. The reaction was held at 35° C. for 3 hours. This prepolymer showed an isocyanate equivalent weight of 1618 grams/equivalent.

281 grams of methyl ethyl ketone and 130.8 grams of LHT 240 (0.550 equivalents) were combined in a reaction vessel whereupon the prepolymer solution was added to it with stirring. After the isocyanate had reacted, further additions, totaling 14.4 grams, of diphenylmethane diisocyanate were made. The reaction was determined to be complete when no free isocyanate was seen by infrared spectroscopy. The product had an inherent viscosity in tetrahydrofuran of 0.31 and a calculated hydroxy equivalent weight of 2600 grams/equivalent. The sulfonate equivalent weight was calculated to be 13,000 grams/equivalent.

EXAMPLE 7

Preparation of Preferred Polyurethane Material With Higher Sulfonate Content (Sample 5)

797 grams of methyl ethyl ketone, 42.0 grams of neopentyl glycol (0.807 equivalents), and 180 grams of sulfonate diol monomer similar to monomer B, having a hydroxy equivalent weight of 1178 and a sulfonate equivalent weight of 1765 (0.153 equivalents hydroxy) were combined. 100 grams of methyl ethyl ketone was distilled off. 156.1 grams of diphenylmethane diisocyanate (1.249 equivalents) and 0.02 grams. of dibutyltin dilaurate were added. The reaction mixture of this prepolymer solution was held at 35° C. for 3 hours.

266 grams of methyl ethyl ketone and 140.5 grams of Tone TM 0305 (0.780 equivalents) were combined in a reaction vessel. The prepolymer solution was added to this mixture with stirring. After the isocyanate had reacted, further additions totaling 22.8 grams of diphenylmethane diisocyanate were made. The reaction was determined to be complete when no free isocyanate was seen by infrared spectroscopy. The product had an inherent viscosity in tetrahydrofuran of 0.28 and a calculated hydroxy equivalent weight of 1750 grams/equivalent. The sulfonate equivalent weight was calculated to be 5,300 grams/equivalent.

EXAMPLE 8

Preparation of Polyurethane Made With Trimethylol Propane of Molecular Weight 135 (Sample 6)

187 grams of methyl ethyl ketone, 47 grams of cyclohexanone, 39.3 grams of Tone TM 0210 (0.095 equivalents), 23.7 grams of sulfonate monomer B (0.028 equivalents hydroxy), and 8.79 grams of neopentyl glycol (0.169 equivalents) were combined, and 60 grams of methyl ethyl ketone was distilled off under nitrogen. The mixture was cooled to 45° C., and 48.2 grams of diphenylmethane diisocyanate (0.386 equivalents) plus 0.02 grams of dimethyltin dilaurate were added. The reaction mixture was refluxed for 4 hours.

After cooling of this prepolymer solution to 35° C., 6.01 grams of trimethylol propane (0.134 equivalents) were added and the reaction was returned to reflux. No isocyanate remained unreacted after 30 minutes. Analysis of the product showed an inherent viscosity in tetrahydrofuran of 0.34. The hydroxy equivalent weight and sulfonate equivalent weight were calculated to be 3100 grams/equivalent and 10,000 grams/equivalent, respectively.

EXAMPLE 9

Preparation of Polyurethane Made Using Polycaprolactone Triol and a One Step Method (Sample 7)

176 grams of sulfonate monomer A (0.323 equivalents hydroxy), 44.0 grams of neopentyl glycol (0.845 equivalents), and 133.1 grams of Tone TM 0305 (0.730 equivalents) were dissolved in 1 liter of methyl ethyl ketone, and 150 grams of solvent was distilled off. 189.55 grams of diphenylmethane diisocyanate (1.52 equivalents) was added followed by 0.1 grams of dibutyltin dilaurate. The reaction mixture was heated to 50° C. and held until no isocyanate functionality remained. An additional 4 grams of diphenylmethane diisocyanate was added to produce a final inherent viscosity of 0.30, a calculated hydroxy content of 1600 grams per equivalent hydroxy, and a calculated sulfonate content of 11,600 grams/equivalent.

EXAMPLE 10

Preparation of Polyurethane Made From Glycerol of Molecular Weight 92 By a One Step Method (Sample B)

178 grams of sulfonate monomer A (0.327 equivalents hydroxy), 125 grams of Tone TM 0210 (0.303 equivalents), 22.7 grams of neopentyl glycol (0.436 equivalents), and 27.4 grams of glycerol (0.894 equivalents) were dissolved in 1 liter of methyl ethyl ketone, and 150 grams of solvent was distilled off. 183.8 grams of diphenylmethane diisocyanate (1.47 equivalents) was added followed by 0.1 grams of dibutyltin dilaurate. The reaction mixture was heated to 50° C. and held until no isocyanate functionality remained. An additional 6.5 grams of diphenylmethane diisocyanate was added to produce a final inherent viscosity of 0.30, a calculated hydroxy content of 1250 grams per equivalent hydroxy, and a calculated sulfonate content of 11,000 grams/equivalent.

EXAMPLE 11

Preparation of Polyurethane Made From Glycerol By The Prepolymer Method (Sample 9)

184 grams of methyl ethyl ketone, 46 grams of cyclohexanone, 38.7 grams of Tone TM 0210 (0.094 equivalents), 23.4 grams of sulfonate monomer B (0.027 equivalents hydroxy), and 9.19 grams of neopentyl glycol (0.177 equivalents) were combined, and 60 grams of methyl ethyl ketone was distilled off under nitrogen. The mixture was cooled to 45° C., and 48.8 grams (0.390 equivalents) of diphenylmethane diisocyanate plus 0.02 grams of dimethyltin dilaurate were added. The reaction mixture was brought to reflux and held for 4 hours.

After cooling to 42° C., 4.05 grams (0.13 equivalents) of glycerol was added and the reaction was returned to reflux. No isocyanate remained unreacted after 30 minutes. Analysis of the product showed an inherent viscosity in tetrahydrofuran of 0.29 and a percent solids of 35. The hydroxy equivalent weight and sulfonate equivalent weight were calculated to be 3000 grams/equivalent and 10,000 grams/equivalent, respectively.

EXAMPLE 12

Preparation of the Comparison Polyurethane Containing No Sulfonate (Sample 10)

792 grams of methyl ethyl ketone, 32.43 grams of neopentyl glycol (0.624 equivalents), and 129.7 grams of Tone TM 0230 (0.205 equivalents) were combined and heated to reflux. 120 grams of methyl ethyl ketone was distilled off. 134.6 grams of diphenylmethane diisocyanate (1.07 equivalents) and 0.02 grams of dibutyltin dilaurate were added. The reaction mixture was held at 35° C. for 3 hours. This prepolymer was drained to a clean dry holding container. It showed an isocyanate equivalent weight of 1855 grams/equivalent.

After removing the prepolymer, 300 grams of methyl ethyl ketone and 128.9 grams of Tone TM 0305 (0.716 equivalents) were combined in the reaction vessel. The prepolymer solution was then added to this reaction mixture with stirring. After the isocyanate had reacted, a further addition of 31.1 grams of diphenylmethane diisocyanate was made in seven increments, allowing the isocyanate to react completely after each increment. The product had an inherent viscosity in tetrahydrofuran of 0.36 and a calculated hydroxy equivalent weight of 1500 grams/equivalent.

EXAMPLE 13

Preparation of Polyurethane Containing No Pendant Hydroxy Groups (Sample 11)

55.4 grams of Tone TM 0230 (0.087 equivalents), 21.64 grams of sulfonate monomer B (0.025 equivalents hydroxy), 7.05 grams of neopentyl glycol (0.136 equivalents), 225 grams of methyl ethyl ketone, and 43 grams of cyclohexanone were combined and heated to reflux. 50 grams of ketone was distilled off. 30.9 grams of diphenylmethane diisocyanate (0.247 equivalents) was added followed by 0.02 grams dibutyltin dilaurate, whereupon the reaction was heated to reflux. After 2 hours of refluxing, no isocyanate remained according to infrared spectroscopy. The sulfonate equivalent weight was determined to be 10,300 by sulfur analysis. The inherent viscosity was determined to be 0.45 in tetrahydrofuran.

EXAMPLE 14

Preparation of Dispersions

Dispersions using the Samples 1-11 above were prepared as follows: 100 parts of fine Co-$\gamma$-Fe$_2$O$_3$ pigment having a surface area of 50 m$^2$/g and powder coercivity of 780 Oersted, 30 parts of the polyurethane resin, 134 parts of methyl ethyl ketone, 45 parts of toluene and 45 parts of cyclohexanone were combined and shaken in a 0.5 liter sandmill, with steel media, for 8 hours.

The resulting dispersion was applied to a film of polyethylene terephthalate (thickness of 25 microns) with a knife coating method. The resulting coated film was allowed to stand in a parallel magnetic field of 1,400 Oersted for about one second. The magnetic layer obtained had a thickness of about 5 microns.

EXAMPLE 15

Procedure for Measuring Polymer Percent Cure

For each of Samples 1-11 above, 4 grams of a 25% solids solution in methyl ethyl ketone of each sample was added to 0.13 grams of Mondur TM CB-75 (Mobay Chemical Co.) triisocyanate. This solution was coated at a 1 to 2 mil thickness onto a polypropylene backing film and the composite was placed in a 65° C. oven for 5 minutes. The solution was subsequently stored at 21° C. and 50% relative humidity for 7 days whereupon the polyurethane film was peeled from the polypropylene backing. A weighed sample of the polyurethane film was placed in approximately 25 grams of tetrahydrofuran for 2 hours. The solvent was decanted into a weighed pan and evaporated at 105° C. for 2 hours. The percent cure was calculated as follows:

$$\text{polymer \% cure} = 100 \times \frac{[(\text{weight of polymer film}) - (\text{weight extracted})]}{(\text{weight of polymer film})}$$

The results are reported in Table 1.

EXAMPLE 16

Inherent Viscosity Measurement

The inherent viscosity for each of Samples 1-11 was measured to provide a comparison of the molecular weight of each composition. The inherent viscosity was measured by conventional means using a Wescan #50 viscometer in a water bath controlled at 25° C. to measure the flow time of 10 milliliters of a polymer solution (0.8 grams per deciliter of polymer in tetrahydrofuran solvent) and the flow time of the solvent. In each experiment, inherent viscosity is reported in deciliters per gram. The results are reported in Table 1.

EXAMPLE 17

Dispersion Viscosity

Magnetic dispersion viscosity, in centipoise, was measured for each of Samples 1-11 to provide a comparison of the ease of flow of each dispersion. The magnetic dispersion viscosity was measured on a Brookfield viscometer model LVTD (Brookfield Engineering Laboratories, Inc.) using spindle LV-3 or LV-4. The results are reported in Table 1.

1-5 are all of the preferred type of resin with varying triols and sulfonate content, and prepared using the preferred "prepolymer" synthetic method. Note that all have a squareness ratio of about 0.80 and a dispersion viscosity of less than about 20,000, which are two of the preferred and advantageous characteristics.

Sample 1 is the preferred sulfonated polyurethane binder synthesized from the preferred sulfonate-containing diol monomer A, neopentyl glycol, and diphenylmethane diisocyanate in a first step; and Tone TM 0305 as the triol in a second step. The magnetic dispersion viscosity is a very low 4260 and the magnetic coating squareness is a relatively high 0.82. Thus the resulting material is a preferred, advantageous resin for preparing preferred advantageous dispersions and/or polymer.

Sample 2 contains less sulfonate as compared to Sample 1 (27,000 sulfonate equivalent weight vs 12,000 for Sample 1); however, the squareness and viscosity are still very much acceptable.

Samples 3 and 4 were synthesized using different triols. Sample 3 was synthesized using a lower molecular weight triol (but still above 180), Tone TM 0301, and Sample 4 was synthesized using a triol containing secondary hydroxy groups. Neither variation had a significant detrimental effect on the properties measured of the final resin, dispersion, and polymer. It is noted that the squareness of Samples 3 and 4 were 0.82 and 0.79, respectively.

Sample 5 shows the effect of adding more sulfonate. It was synthesized using a sulfonate-containing diol similar to monomer B, having a hydroxy equivalent weight of 1178 and a sulfonate equivalent weight of 1765. Although the dispersion viscosity is greater than that of the preferred Sample 1, it is still acceptable (less than 20,000), and the squareness ratio is not greatly affected.

Samples 6-9 show that free hydrophobic and soluble hydroxy groups are necessary for good performance. Three different triols are used with the two synthetic methods.

Sample 6 uses a low molecular weight triol, trimethylol propane, and the prepolymer method. This triol has a molecular weight that is below the preferred range (200-1000) and, even though the preferred "prepolymer" method is used, the viscosity is greater than 20,000.

Sample 7 uses the preferred type of triol but the hydroxy groups are derived randomly, i.e. the one-step method is used in which sulfonate-containing diol, non-sulfonate-containing diol, triol, and diisocyanate are all

TABLE 1

| | | Comparison of Resin Function | | | |
|---|---|---|---|---|---|
| SPL # | SYNTHETIC METHOD | TRIOL MOLECULAR WEIGHT | SULFONATE EQUIVALENT WEIGHT | MAGNETIC DISPERSION VISCOSITY | MAGNETIC COATING SQUARENESS | POLYMER % CURE |
| 1 | Prepolymer | 540 | 12000 | 4260 | 0.82 | 94 |
| 2 | Prepolymer | 540 | 27000 | 4500 | 0.82 | 84 |
| 3 | Prepolymer | 297 | 11000 | 4600 | 0.82 | 76 |
| 4 | Prepolymer | 714 | 13000 | 9180 | 0.79 | 80 |
| 5 | Prepolymer | 540 | 5300 | 11500 | 0.81 | 88 |
| 6 | Prepolymer | 135 | 10000 | 25200 | 0.78 | 92 |
| 7 | One-step | 540 | 12000 | 28000 | 0.78 | 77 |
| 8 | One-step | 92 | 11000 | 44600 | 0.69 | 80 |
| 9 | Prepolymer | 92 | 10000 | 62200 | 0.73 | 92 |
| 10 | Prepolymer | 540 | NO SULFONATE | 172000 | 0.64 | 90 |
| 11 | — | NO TRIOL | 10000 | LOW | GOOD | 0 |

The results for Samples 1-11 in Table 1 are tabulated according to their performance. In general, Samples mixed together in one step. Note the larger dispersion viscosity value and lower squareness value as compared to any of Samples 1-5, especially Sample 1.

Sample 8 uses a low molecular weight triol, glycerol, and random synthesis, and results in an unacceptably high viscosity and unacceptably low squareness ratio.

Sample 9 uses a low molecular weight triol, glycerol, and the prepolymer method. This, however, still does not result in acceptable resin and polymer properties.

Sample 10 illustrates the need for sulfonate. Without sulfonate, dispersion viscosity is very high and magnetic properties are poor.

Sample 11 demonstrates the need for hydroxy groups to give good cure performance.

EXAMPLE 18

Preparation of Polycarbonate-Based Sulfonate Monomer (C)

938 grams of Duracarb ™ 120 (2.12 equivalents), 144 grams of toluene, and 78.66 grams of DMSSIP (0.53 equivalents) were combined and then heated under a vacuum to 105° C. with distillation of toluene. The vacuum was released under nitrogen and 0.5 grams of tetrabutyltitanate catalyst was added. The system was then heated to 200° C. under nitrogen and maintained at this temperature for 3 hours while collecting a distillate of methanol and residual toluene.

After cooling to 120° C., the reaction mixture was placed under a vacuum, and the temperature was increased to 200° C. This temperature was held for 0.5 hours. The product was filtered and cooled. The hydroxy equivalent weight by analysis was determined to be 580 grams/equivalent. The sulfonate equivalent weight was calculated to be 3770 grams/equivalent.

EXAMPLE 19

Preparation of Polyurethane Material With Polycarbonate-Based Sulfonate Monomer (C) (Sample 12)

843 grams of methyl ethyl ketone, 175 grams of polycarbonate-based sulfonated monomer C (0.3 equivalents), and 46.6 grams neopentylglycol (0.9 equivalents) were combined and 100 grams of methyl ethyl ketone was distilled off under nitrogen. The remaining mixture was cooled to 50° C., after which 194.5 grams of diphenylmethane diisocyanate (1.56 equivalents) and 0.1 grams of dibutyltin dilaurate were added. The resulting mixture was held at 35° C. for 3 hours, whereupon 135.3 grams of Tone 0305 polycaprolactone (0.743 equivalents) and 281 grams of methyl ethyl ketone were added. After adding these additional materials, the mixture was heated to reflux and held at reflux for 2 hours. While maintaining the reaction at reflux, an additional 7.4 grams of diphenylmethane diisocyanate (0.06 equivalents) were added in two stages and allowed to react until no isocyanate functionality was detected by infrared analysis. The product had an inherent viscosity of 0.29. The hydroxyl equivalent weight was calculated to be 1700 grams/equivalent. The sulfonate equivalent weight was calculated to be 12,000 grams/equivalent.

EXAMPLE 20

Preparation of Polyurethane Material Having Sulfonate Moieties, SO$_3$M, in which M is Ammonium (Sample 13)

200 grams of a sulfonated polyurethane prepared in accordance with Example 3 (Sample 1) was combined with a sufficient amount of methyl ethyl ketone to yield a solution having 35% by weight solids. This solution was combined with 50 grams of a saturated ammonium chloride solution and agitated for 2 hours. The resulting dispersion was allowed to stand overnight, whereupon the dispersion separated into an aqueous phase and a nonaqueous phase. The lower, aqueous phase was separated and discarded. The remaining material was combined with 100 grams of methyl ethyl ketone, which was then distilled off in order to dry the product. An additional 100 grams of methyl ethyl ketone was added and distilled off to further dry the product. The resulting product was filtered to give a clear solution of the ammonium salt of a sulfonated polyurethane.

EXAMPLE 21

Preparation of Dispersions

Dispersions A, B, and C, using the polyurethane resins prepared in accordance with Examples 3, 19, and 20, respectively, were prepared as follows: 100 parts by weight of fine Co-$\gamma$-Fe$_2$O$_3$ pigment having a specific surface area of 50 m$^2$/g, 20 parts by weight polyurethane resin, 108 parts by weight methyl ethyl ketone, 36 parts by weight toluene, and 36 parts by weight cyclohexanone were combined in a 0.5 liter sandmill. The contents of the sandmill were mixed with steel media for 8 hours. A coating of the resulting dispersion was applied to a polyethylene terephthalate film (thickness of 25 microns) with a knife. The coated film was allowed to stand in a parallel magnetic field of 1400 Oersted for about one second. The magnetic layer obtained had a thickness of about 5 microns.

The inherent viscosity, magnetic dispersion viscosity, squareness ratio, and 45 degree gloss for these dispersions are presented in Table 2:

TABLE 2

| Comparison of Dispersion Samples A, B, and C | | | | |
|---|---|---|---|---|
| Dispersion | Inherent Viscosity | Magnetic Dispersion Viscosity (centipoise) | Squareness Ratio | 45 Degree Gloss |
| A | .29 | 6360 | 0.81 | 80 |
| B | .29 | 5660 | 0.81 | 78 |
| C | .29 | 5580 | 0.81 | 78 |

The data in Table 2 show that all three dispersions have excellent characteristics. Each has a magnetic dispersion viscosity of much less than 20,000 centipoise, indicating that the dispersions will have excellent coating and magnetic orientation properties. Each dispersion has a squareness ratio of 0.81, which also indicates that these dispersions have excellent magnetic orientation and electromagnetic properties. Each of the dispersions is also characterized by relatively high value for the 45 degree gloss measurement. The 45 degree gloss value is a measure of the micro-smoothness of a magnetic coating. Generally, a higher 45 degree gloss value indicates a smoother magnetic coating. A relatively high value for the 45 degree gloss is desirable, because a smoother magnetic recording provides better electromagnetic performance.

Other embodiments of this invention will be apparent to those skilled in the art from a consideration of this specification or from the practice of the invention disclosed herein. Various omissions, modifications, and changes to the principles described herein may be made by one skilled in the art without departing from the true scope and spirit of the invention which is indicated by the following claims.

We claim:

1. A method of preparing a curable, sulfonated, hydroxy-functional polyurethane polymer, comprising the step of reacting a polyol with a sulfonated polyisocyanate having at least two reactive isocyanate groups wherein:
   (a) said polyol has at least three reactive hydroxy groups and a hydroxy equivalent weight of at least 60;
   (b) said polyol is present in a sufficient amount such that:
      (i) there is at least about a 67% excess of reactive hydroxy groups relative to reactive isocyanate groups;
      (ii) said polyurethane polymer has a hydroxy equivalent weight of between about 500 and about 10,000; and
      (iii) at least about 90% of the hydroxy-functionality in said polyurethane polymer results from said polyol; and
   (c) said sulfonated polyisocyanate is present in a sufficient amount such that said polyurethane polymer has a sulfonate equivalent weight of between about 2,000 and about 100,000.

2. The method of preparing a polyurethane polymer according to claim 1, further comprising the step of preparing said sulfonated polyisocyanate by reacting a sulfonate-containing diol with an excess of polyisocyanate.

3. The method of preparing a polyurethane polymer according to claim 2, wherein there is at least a 30% excess of isocyanate functionality in said polyisocyanate relative to hydroxy functionality in said sulfonated diol.

4. The method of preparing a polyurethane polymer according to claim 1, wherein:
   (a) said polyol is a triol; and
   (b) said polyol has a molecular weight of from about 200 to about 1000.

* * * * *

UNITED STATES PATENT AND TRADEMARK OFFICE
CERTIFICATE OF CORRECTION

PATENT NO. : 5,185,423
DATED : February 9, 1993
INVENTOR(S) : Ohkubo, et. al.

It is certified that error appears in the above-indentified patent and that said Letters Patent is hereby corrected as shown below:

On the Title page, item [22] should be -- Filed: Aug. 29, 1991--.
On the Title page, item [57] Abstract, line 3, "wtihin" should be --within--.
                            line 6, "polymerr" should be --polymer--.

Col. 4, line 50, "backbone polyurethane" should be --backbone. The polyurethane--.

Col. 5, line 6, "Na," should be --$Na^+$,--.

Col. 13, line 40, "B)" should be --8)--.

Signed and Sealed this

Thirtieth Day of November, 1993

Attest:

BRUCE LEHMAN

Attesting Officer      Commissioner of Patents and Trademarks